Patented Dec. 20, 1932

1,891,255

UNITED STATES PATENT OFFICE

PHILIP G. WRIGHTSMAN, OF CHESTER, PENNSYLVANIA, ASSIGNOR TO E. I. DU PONT DE NEMOURS & COMPANY, OF WILMINGTON, DELAWARE, A CORPORATION OF DELAWARE

NITRATED CARBOHYDRATE EXPLOSIVES AND PROCESS OF PRODUCING THE SAME

No Drawing.   Application filed December 20, 1927.   Serial No. 241,457.

My invention relates particularly to explosives obtained by nitrating solutions of carbohydrates in chlorine derivatives of polyhydric alcohols and has for its object the production of liquid explosives possessing satisfactory properties for use in dynamites and containing higher proportions of carbohydrates than it has been practical to use heretofore.

Solutions of sugars in glycerin or in mixtures of glycerin with other polyhydric alcohols have been widely used in the manufacture of liquid explosive dynamite ingredients. Solutions of carbohydrates in monochlorhydrin are claimed in U. S. Patents Nos. 1,463,980 and 1,473,685 granted to Sturgis in 1923. The use of sugar possesses, on the one hand, the advantages of lowering the cost and depressing the freezing point of the nitrated product and, on the other hand, the disadvantages of lowering the stability and increasing the viscosity of the nitrated product, thereby making it more difficult to wash free of acid and settle to a low moisture content. In practice, a solution of about 20% sugar has been most extensively used. While efforts have been made to introduce other carbohydrates in place of sucrose, this carbohydrate in the form of cane or beet sugar is by far the most satisfactory, considering price, purity, supply, stability, yield, explosive properties, etc.

In the case of sucrose it has not been practical to use more than 20% sugar without special equipment. Even with special apparatus and the observance of special precautions, 25% sugar solution seems to be the practical maximum (U. S. Patent No. 1,478,588, granted to Ernest M. Symmes, December 25, 1923).

The factors which have limited the proportion of sugar in the past are as follows:—

1. With glycerin or glycerin-diglycerin mixtures the use of more than 20% sucrose, either dissolved or suspended, gives a nitrated oil of such high viscosity that it is impractical without special equipment and process to purify, stabilize, and settle to low moisture content.

2. With glycerin-diglycerin mixtures the use of more than 20% sucrose either dissolved or suspended gives a nitrated product of undesirably low sensitiveness.

3. With glycerin, diglycerin, ethylene glycol, chlorhydrins or mixtures of these, the solubility of sucrose is so low that the dissolution of more than 25% cannot be accomplished without great danger of scorching the solution, and the solution if prepared, does not stand a practical length of time without crystallization taking place.

The composition of a saturated solution of cane sugar in glycerin, ethylene glycol, chlorhydrins, or mixtures of these at normal room temperature, for example 70° F., is about 8% to 10% sugar although supersaturated solutions containing 20% to 25% sucrose will stand at room temperature considerable time before crystallizing. The preparation of a solution of more than 25% sugar in glycerine, diglycerin, ethylene glycol or chlorhydrins seems impractical because the higher temperature required scorches the solution. The use of over 25% sucrose solution seems impractical because of the relatively rapid rate of crystallization at room temperature and because scorching takes place if the solution is stored above the temperature of the saturation point. Scorched solutions cause separation and washing troubles in preparing the nitrated product.

The introduction of chlorhydrins, particularly those having two or three carbon atoms, in glycerin-sugar mixtures gives a nitrated product of lower viscosity, which is more readily purified and which produces dynamites of increased sensitiveness. Therefore, in the presence of nitrated chlorhydrins, larger proportions of nitrated sugars may be satisfactorily used.

Invert sugar and many of the monosaccharides are more soluble in polyhydric alcohols and chlorhydrins than sucrose. These aldohexoses and ketohexoses such as glucose, fructose, mannose, etc., are not as satisfactory as sucrose owing to their low yields on nitration and the properties of the explosives produced. It is therefore desirable to obtain the full advantage of sucrose by using the practical maximum proportion and then to use a more soluble sugar in solution with the sucrose. The proportion of sucrose which it is practical to use satisfactorily in solution in a chlorhydrin or mixtures of chlorhydrins and polyhydric alcohols depends upon both the solubility of sucrose in the solvent and the viscosity of the solution.

I have discovered that by dissolving in a chlorhydrin medium a monosaccharide in addition to the sucrose, the practical maximum proportion of sucrose may be retained in solution in addition to substantial proportions of monosaccharide and that these solutions on nitration produce explosive oils suitable for use in commercial explosive compositions.

The following specific example is given to illustrate my process:—For reasons stated above, 25 parts sucrose in 75 parts chlorhydrin or chlorhydrin-polyhydric alcohol mixture is the maximum proportion of sucrose which it is practical to satisfactorily use. In applying my process, a solution of 25 parts sucrose and 15 parts glucose in 60 parts glycerol monochlorhydrin may be used. The solution is subjected to the action of a mixture of sulfuric and nitric acids. The nitrated product is allowed to separate in the usual way. It is drawn off and washed with water, sodium carbonate solution and sodium chloride solution. A stabilizer, such as for example diphenylamine, may be added. Additional washes, purification and stabilization may be used if desired. The nitration, purification and stabilization are essentially the same as for a 20% solution of sucrose in glycerin. The product obtained is satisfactory for use in commercial explosive compositions.

In addition to the above example, the following further illustrate compositions which may be employed in carrying out my process:—

|  | Per cent |
|---|---|
| Sucrose | 25 |
| Glucose | 15 |
| Ethylene glycol | 30 |
| Glycerol monochlorhydrin | 30 |

|  | Per cent |
|---|---|
| Sucrose | 20 to 25 |
| Glucose | 10 to 30 |
| Glycerol monochlorhydrin | 45 to 70 |

|  | Per cent |
|---|---|
| Sucrose | 20 to 25 |
| Glucose | 10 to 30 |
| Ethylene glycol | 20 to 60 |
| Glycerol monochlorhydrin | 20 to 50 |

In place of glucose, another monosaccharide may be used such as fructose or mannose, or a mixture of monosaccharides may be used. In place of ethylene glycol, another glycol or mixture of glycols may be used, or any polyhydric alcohol solvent such as diglycerin may be introduced. In place of glycerol monochlorhydrin, a mixture of glycerin and chlorhydrin may be used.

The above refers to compositions before nitration. The different ingredients give different yields after nitration and for this reason the proportions will not of course be the same. For example, to illustrate more fully, 16 per cent nitrated disaccharide in a nitrated explosive corresponds to 20 per cent disaccharide in the mixture before nitration. And, further, when a mixture of 80 parts glycerin and 20 parts cane sugar is nitrated, there is obtained a mixture of 84 parts nitroglycerin and 16 parts nitrated sugar. Similarly, only 6 per cent nitrated glucoside is obtained by nitrating a mixture containing 10 per cent glucose. I may, however, use as little as 5 per cent of the monosaccharide which gives on nitration approximately 4 per cent nitrated monosaccharide.

The practical maximum proportion of sucrose will vary somewhat depending upon the polyhydric alcohol or chlorhydrin solvent and also upon the viscosity and the temperature of storage of the solution.

While I have described my invention and given detailed and specific examples, I do not limit myself to the carbohydrates, polyhydric alcohols and chlorhydrins mentioned nor to the proportions given, but include within the scope of my invention the use of any highly soluble carbohydrate which may be used in addition to sucrose in order to increase the proportion of carbohydrate while using the maximum proportion of sucrose.

I claim:

1. A process of manufacturing an explosive containing nitrated carbohydrate, which comprises nitrating a solution containing chlorhydrin and the maximum proportion of sucrose that is soluble in a chlorhydrin medium, and a sugar that is more soluble than sucrose.

2. A process of manufacturing an explosive containing nitrated carbohydrate, which comprises nitrating a solution of more than 5 per cent monosaccharide and more than 20 per cent disaccharide in a chlorhydrin medium.

3. A process of manufacturing an explosive containing nitrated carbohydrate, which comprises nitrating a solution containing more than 5 per cent monosaccharide and more than 20 per cent sucrose in a chlorhydrin medium.

4. The invention of claim 3 in which the monosaccharide is glucose.

5. The invention of claim 3 in which the chlorhydrin is glycerin monochlorhydrin.

6. A process of manufacturing an explosive containing nitrated carbohydrate, which comprises nitrating a solution of about 25% sucrose and 10% to 20% glucose in a chlorhydrin medium.

7. A process of manufacturing an explosive containing nitrated carbohydrate, which comprises nitrating a solution of about 25% sucrose and approximately 15% glucose in glycerin chlorhydrin.

8. The nitrated product of a solution containing the maximum proportion of sucrose that is soluble in a chlorhydrin medium, and a sugar that is more soluble than sucrose.

9. The nitrated product of a solution containing more than 5 per cent monosaccharide and more than 20 per cent disaccharide in a chlorhydrin medium.

10. The nitrated product of a solution of about 25% sucrose and 10% to 20% glucose in a chlorhydrin medium.

11. The nitrated product of a solution of 25 parts sucrose and 15 parts glucose in 60 parts glycerin chlorhydrin.

12. An explosive comprising a nitrated solution of a monosaccharide, a nitrated disaccharide, and nitrated chlorhydrin, said solution containing more than 4% nitrated monosaccharide and more than 16% nitrated disaccharide.

13. An explosive comprising at least 16% nitrated sucrose, 6 to 16% nitrated glucose, and nitrated chlorhydrin.

14. An explosive comprising about 28% nitrated sucrose, 13% nitrated glucose, and 59% nitrated chlorhydrin.

In testimony whereof, I affix my signature.

PHILIP G. WRIGHTSMAN.